(12) United States Patent
Axelrod

(10) Patent No.: US 7,490,579 B2
(45) Date of Patent: Feb. 17, 2009

(54) ANIMAL CHEW WITH CYLINDRICAL PORTION

(75) Inventor: Glen S. Axelrod, Colts Neck, NJ (US)

(73) Assignee: T.F.H. Publications, Inc.

( * ) Notice: Subject to any disclaimer, the term of this patent is extended or adjusted under 35 U.S.C. 154(b) by 0 days.

(21) Appl. No.: 10/994,523

(22) Filed: Nov. 22, 2004

(65) Prior Publication Data

US 2006/0107905 A1 May 25, 2006

(51) Int. Cl.
*A01K 29/00* (2006.01)
(52) U.S. Cl. .................................. 119/707; 119/710
(58) Field of Classification Search ................. 119/707, 119/702, 709–711, 633; D30/160
See application file for complete search history.

(56) References Cited

U.S. PATENT DOCUMENTS

| | | | | |
|---|---|---|---|---|
| 289,550 | A * | 12/1883 | Miles | 15/104.5 |
| 2,103,083 | A | 12/1937 | Lynch | |
| 2,570,733 | A * | 10/1951 | Thomas | 119/72 |
| 3,043,295 | A | 7/1962 | Ward | |
| 3,231,925 | A | 2/1966 | Conder | |
| 3,664,334 | A * | 5/1972 | O'Neil | 601/120 |
| 4,691,665 | A * | 9/1987 | Hefner | 119/77 |
| 4,738,001 | A | 4/1988 | Shipp | 15/106 |
| 4,802,444 | A | 2/1989 | Markham et al. | 119/29 |
| 4,901,673 | A * | 2/1990 | Overstreet | 119/77 |
| 5,027,796 | A | 7/1991 | Linzey | 128/62 |
| 5,062,390 | A * | 11/1991 | Bescherer et al. | 119/72 |
| D333,538 | S * | 2/1993 | Kingsley | D30/199 |
| D337,398 | S | 7/1993 | Axelrod | D30/160 |
| 5,263,436 | A | 11/1993 | Axelrod | 119/710 |
| 5,269,258 | A * | 12/1993 | Brown | 119/57.9 |
| D357,952 | S | 5/1995 | Chen | |
| 5,507,249 | A * | 4/1996 | Shaw | 119/72 |
| 5,647,302 | A * | 7/1997 | Shipp | 119/709 |
| 5,682,835 | A * | 11/1997 | Walter et al. | 119/57.8 |
| 5,944,516 | A | 8/1999 | Deshaies | 433/1 |
| 5,947,054 | A * | 9/1999 | Liethen | 119/57.9 |
| D427,391 | S | 6/2000 | Gill | D30/160 |
| 6,116,191 | A | 9/2000 | Suchowski et al. | 119/709 |
| 6,148,771 | A * | 11/2000 | Costello | 119/709 |
| 6,202,598 | B1 | 3/2001 | Willinger | 119/709 |
| 6,305,326 | B1 | 10/2001 | Suchowski et al. | 119/709 |

(Continued)

OTHER PUBLICATIONS

International Search Report and Written Opinion of the ISR/US mailed Sep. 24, 2007, issued in the counterpart PCT Appln. No. PCT/US05/42521 filed Nov. 22, 2005.

*Primary Examiner*—Son T. Nguyen
(74) *Attorney, Agent, or Firm*—Grossman, Tucker, Perreault & Pfleger, PLLC

(57) ABSTRACT

The present invention provides a method for removing plaque from the exterior surfaces of an animal's teeth. An edible animal chew is supplied of unitary construction. The chew may comprise a molded body having a cylinder portion and a length on a common axial centerline, the cylinder portion comprising a curved surface and a planar surface and carrying a plurality of projections extending from the curved surface. The plurality of projections may extend radially from the curved surface and substantially perpendicular to the common axial centerline. Upon chewing by the animal on the cylinder portion of the animal chew containing the projections on the curved surface, the chew provides therapeutic action regardless of the radial direction in which the cylinder portion may be configured.

16 Claims, 4 Drawing Sheets

U.S. PATENT DOCUMENTS

| | | | |
|---|---|---|---|
| 6,360,695 B2 | 3/2002 | Suchowski et al. | 119/709 |
| 6,415,741 B2 | 7/2002 | Suchowski et al. | 119/711 |
| 6,439,166 B1 | 8/2002 | Markham | 119/710 |
| 6,474,268 B1 | 11/2002 | Suchowski | 119/709 |
| 6,652,279 B2 * | 11/2003 | Santacruz | 433/216 |
| D490,192 S * | 5/2004 | Markusen et al. | D30/124 |
| 6,739,287 B1 | 5/2004 | Sarantis | |
| D501,961 S * | 2/2005 | Jager | D30/160 |
| 7,087,260 B2 * | 8/2006 | Axelrod | 426/623 |
| 2006/0037546 A1 * | 2/2006 | Jung et al. | 119/72 |
| 2006/0090707 A1 * | 5/2006 | Donegan | 119/72 |

* cited by examiner

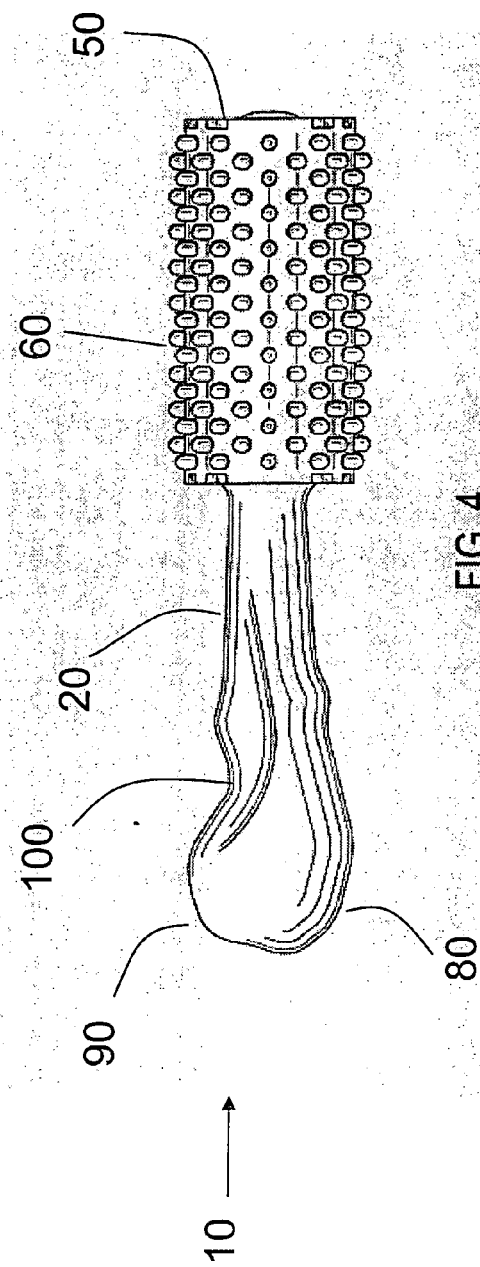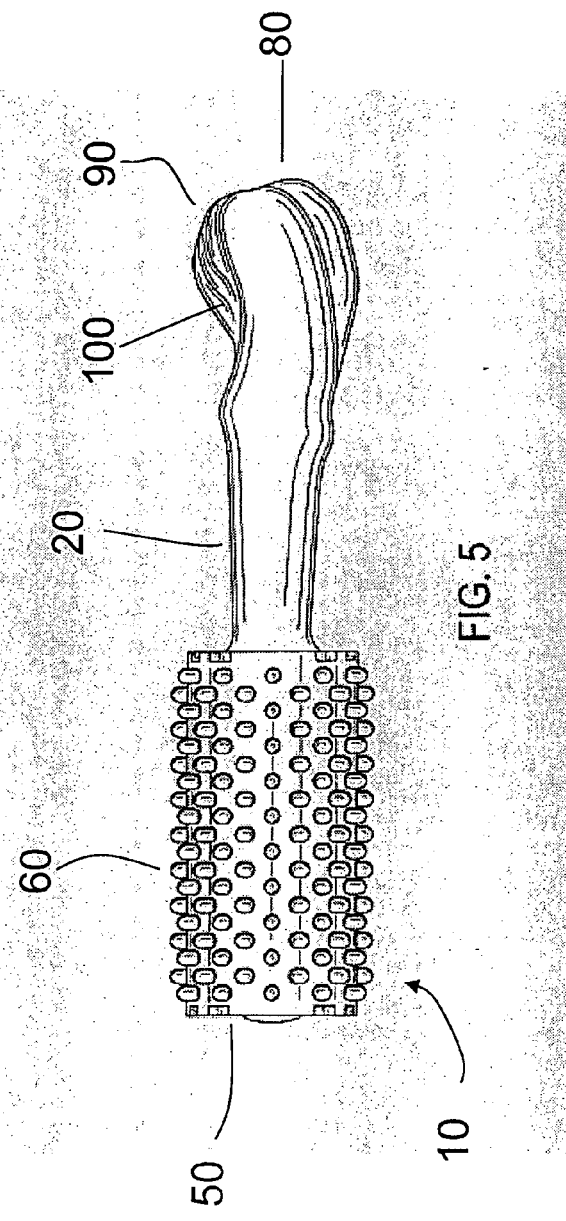

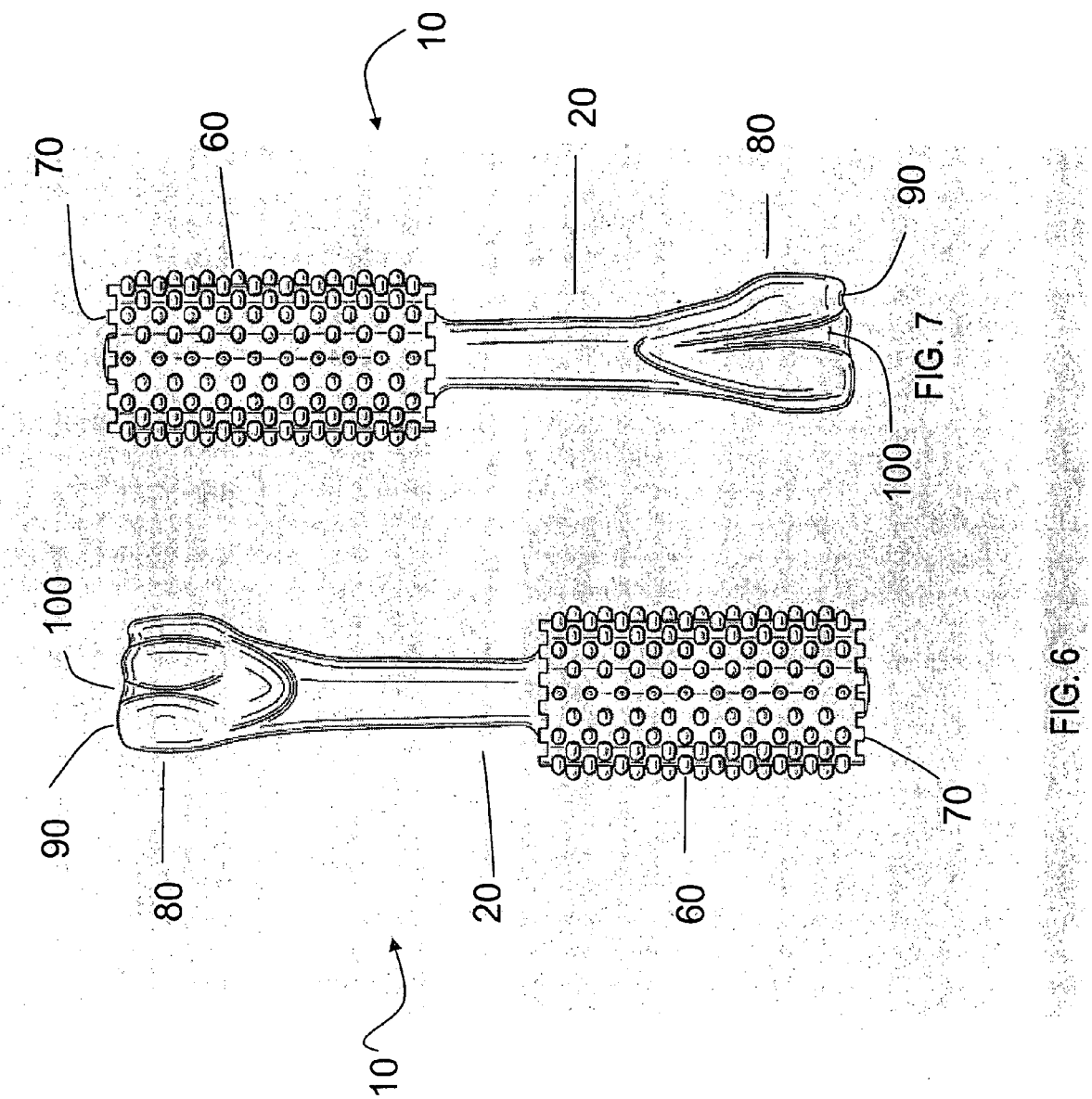

ANIMAL CHEW WITH CYLINDRICAL PORTION

FIELD OF INVENTION

The present invention relates to animal chew toys that have projections to remove plaque from the exterior surface of animal teeth. More particularly, the present invention relates to animal chew toys of unitary construction with a cylindrical portion and length on a common axial centerline, with a plurality of projections extending radially from a curved surface and substantially perpendicular to the centerline. The present invention also relates to a method of removing plaque from the exterior surfaces of an animal's teeth using an animal chew toy that provides consistent exposure to projections that provide therapeutic action.

BACKGROUND

Animal pets, such as dogs and cats, like their human counterparts, are subject to dental health problems. These problems can be traced to the formation of bacterial plaque that forms on the exterior surface of teeth. Plaque is an invisible, sticky film of bacteria, salivary proteins and polysaccharides that are not easily washed away. Plaque is now generally recognized as the main culprit of poor oral health. Bacteria that produce the acid for the caries process are held to the tooth surface by the plaque matrix as well as other bacteria which cause redness and swelling (gingivitis). The presence of these bacteria, if left untreated, may spread to cause malodor, periodontal disease, gingival pockets and bone loss.

Dental calculus, or tartar, is the result of the thickening and hardening (mineralization) of dental plaque. Tartar, which is not easily removed, accumulates on the tooth surface, mainly at the gingival margin opposite the salivary glands. It is a hard mineral deposit containing predominantly calcium and phosphate, very tightly bound to the tooth surface. Once it is formed, tartar is virtually impossible to remove except by a dental professional. Tartar can become unsightly if growth is left unimpeded, and elimination is desirable as the porous surface of the calculus will be covered by a thin layer of unmineralized plaque that can cause constant irritation of the gums and can trigger other problems once calculus is formed below the gum line.

A variety of products have been manufactured to provide animal pets with objects to chew or gnaw. They are intended to provide the pet with exercise and to satisfy the need for chewing that arose when the natural pet food, raw meat, were replaced with processed pet foods. Rawhide strips knotted on the ends to resemble bones, for example, provide abrasion for cleaning teeth by removing tartar and massaging the gums, which is not provided by the typical canine dog food.

Numerous devices have also been employed that use a variety of projections and grooves to remove plaque from the exterior of animal teeth. Examples of such devices include, but are not limited to the following. U.S. Pat. No. 5,944,516 discloses a device for cleaning the teeth of a dog or other animal. The device comprises of a core element and a deformable outer shell. Brushes extending from the core element protrude through openings in the outer shell upon deformation of the outer shell. U.S. Pat. No. 5,647,302 discloses a device for animal dental hygiene including a bone shaped body made of tough rubber-like material. A number of opposing spiral grooves are formed into the bone shaped body. U.S. Pat. No. 5,263,436 discloses a bone-shaped therapeutic chew toy device having a number of sharp conically shaped spikes distributed over the surface of the chew. The device is molded from a hard and tough material. U.S. Pat. No. 6,116,191 discloses a synthetic chew formed with a rigid frame and a softer chewing portion. The chew portion can include a plurality of projections extending outward from a base of the chew portion.

As demonstrated by the above, several examples of animal chews have been developed utilizing a series of projections to remove plaque from the animals' teeth. However, these prior art animal chews lack significant surfaces to be grasped by animals or their owners without interference of the projections. The chews also do not maintain uniform cleaning surfaces when grasped in any radial direction. Accordingly, a need remains to advance the design of the prior art products to improve the efficiency of a given chew toy to enhance the dental hygiene requirements of the animal.

There is therefore a need in the pet chew field for an animal chew toy that can rub between the sides of the animal's teeth and massage the gums of the animal to reduce the build up of plaque and loss of teeth due to periodontal disease while maintaining a portion of the chew toy for the animal or owner to grasp without interference from the projections. Furthermore, there remains a need for a chew that provides cleaning no matter what radial direction the chew is grasped.

It is therefore an object of the present invention to provide a method for removing plaque using an animal chew toy having projections that are uniquely positioned to provide optimum cleaning of the animal's teeth, which chew toy may be of unitary construction and formed from edible resin materials.

It is therefore another object of the present invention to provide a method for removing plaque using an animal chew toy that provides consistent exposure to the projections regardless of the radial direction the chew is applied.

SUMMARY

An aspect of the present invention provides a method for removing plaque from the exterior surfaces of an animal's teeth comprising supplying an edible animal chew of unitary construction comprising a molded body having a cylinder portion and a length on a common axial centerline, the cylinder portion comprising a curved surface and a planar surface and carrying a plurality of projections extending from the curved surface wherein the plurality of projections extend radially from the curved surface and substantially perpendicular to the common axial centerline with the animal chew, wherein upon chewing by the animal on the cylinder portion of the animal chew containing the projections on the curved surface provides therapeutic action regardless of the radial direction in which the cylinder portion may be configured during chewing.

The above and other objects, features, and advantages of the present invention will be apparent in the following detailed description thereof when read in conjunction with the appended drawings wherein the same reference numerals denote the same or similar parts throughout the several views.

BRIEF DESCRIPTION OF DRAWINGS

Features and advantages of the present invention are set forth herein by description of embodiments consistent with the present invention, which description should be considered in conjunction with the accompanying drawings, wherein:

FIG. 4 is a side view of the present invention shown in FIG. 1;

FIG. 5 is a side view of the present invention shown in FIG. 1;

FIG. 6 is a front view of the present invention shown in FIG. 1; and

FIG. 7 is a rear view of the present invention shown in FIG. 1.

DETAILED DESCRIPTION OF DRAWINGS

The present invention relates to an animal chew toy that has projections to remove plaque from the exterior surface of animal teeth. More particularly, the present invention relates to an animal chew toy, preferably of unitary construction, with projections that maintains a portion of the chew for easy grasping by the animal or owner without interference from the projections. More particularly, the present invention relates to animal chew toys that provide consistent exposure to the projections regardless of the radial direction that the toy is grasped by the animal. More particularly, the present invention relates to a method of removing plaque from the exterior surfaces of an animal's teeth using an animal chew toy that provides consistent exposure to projections that provide therapeutic action.

Figure 1:
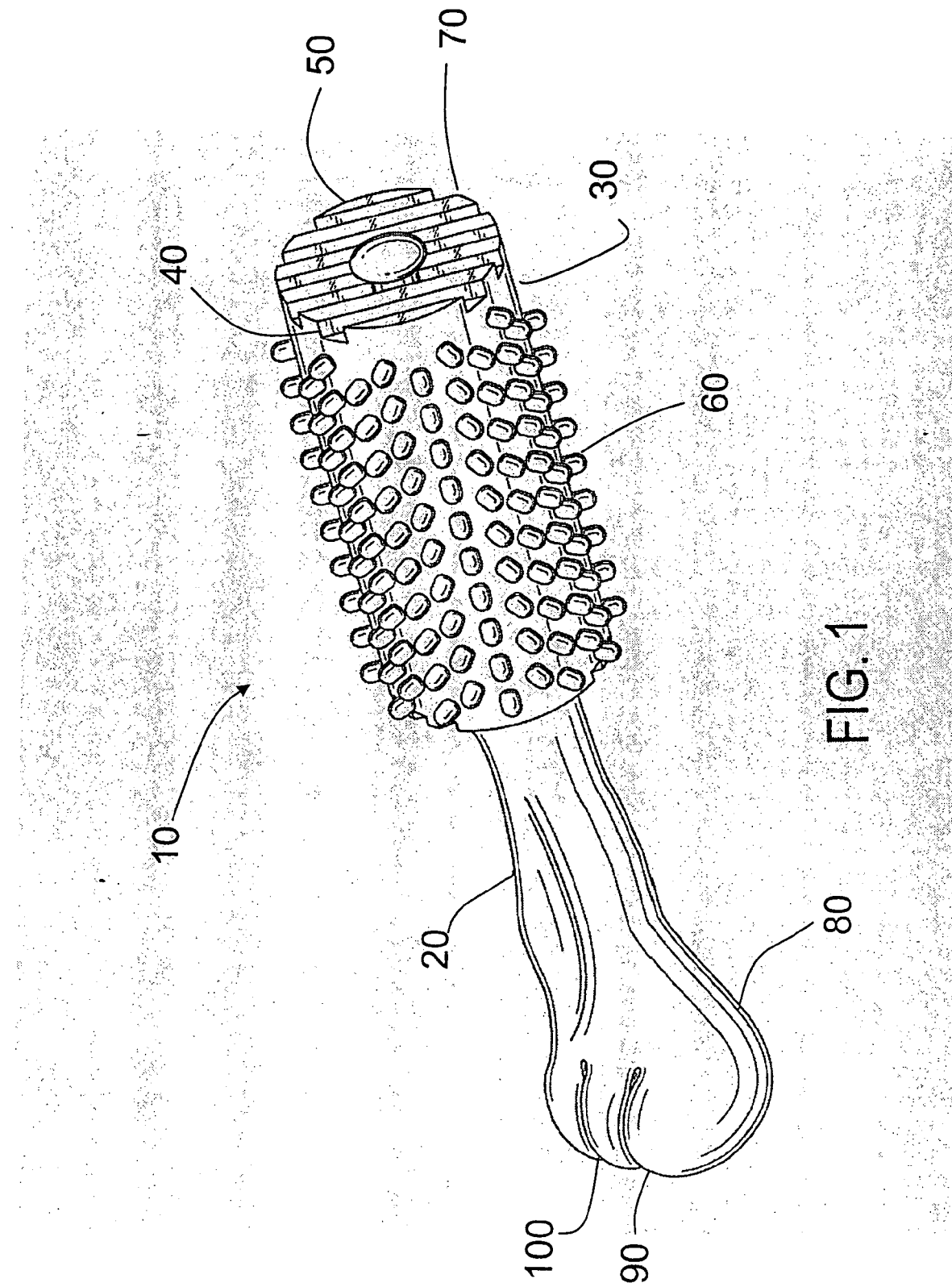
FIG. 1 is a perspective view of an embodiment of the present invention.
Figure 2:
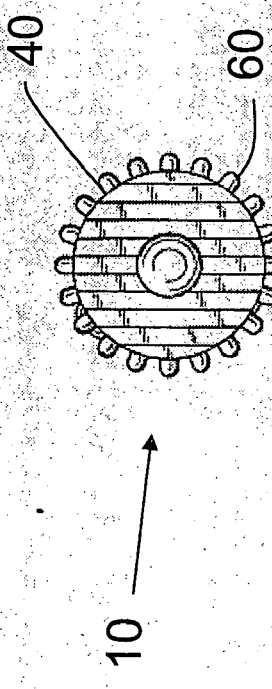
FIG. 2 is a top view of the present invention shown in FIG. 1.
Figure 3:
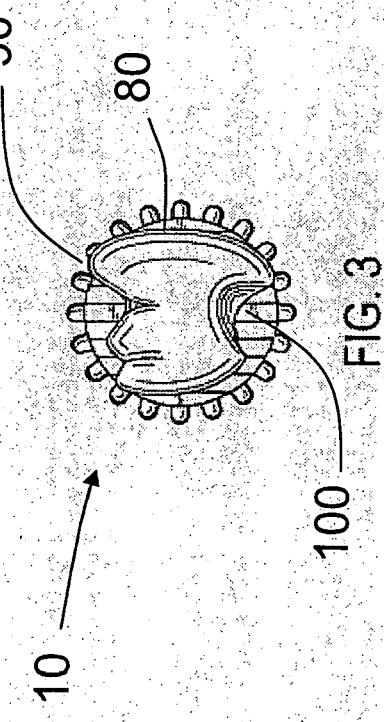
FIG. 3 is a bottom view of the present invention shown in FIG. 1.

Turning to FIG. 1-7, illustrating an embodiment of the animal chew, the animal chew 10 generally comprises a length 20 and a cylinder 30. The cylinder 30 has a curved surface 40 and a planar surface 50. A number of projections 60 extend from the curved surface 40. A number of ribs 70 extend from the planar surface 50. From the length 20 extends a bulbous portion 80. Bulbous portion 80 further comprises a series of knobs 90 and depressions 100.

It should be appreciated that the animal chew 10 may be molded from a variety of materials including hard material, soft material, digestible material and indigestible material. Preferably, the animal chew is made of starch, casein, denatured and partially hydrolyzed collagen, thermoplastic polymers or mixtures thereof. More preferably, the thermoplastic polymers include polyamides, polyurethanes and ethylene copolymers. Most preferably, the animal chew is made of a digestible material having a starch base, and in particular, a wheat based starch. A variety of additives may be added as well including attractants, humectants, vitamins and flavorings.

Preferably, the animal chew 10, as noted, is made of a wheat starch composition, which provides a non-resilient type composition, and the plurality of projections 60 are not deformable in response to the biting action of an animal. In that sense, the relatively rigid, but edible composition, provides enhanced teeth cleaning capability.

It should be appreciated that the present invention may be manufactured from a variety of methods. In a preferred embodiment of the present invention, the animal chew is manufactured by a melt conversion process. More preferably the present invention is made from the injection molding process.

It should also be appreciated that the size of the animal chew may vary with respect to the size and interest of the animal. Preferably, the projections and ribs may vary according to animal size. More preferably, the projections and ribs may be of an assortment of sizes on a single chew. Most preferably, the ribs and projections are sized to locate between and contact between the animal's teeth when chewed including the front incisors, canines and molars of the animal.

In an embodiment of the present invention, the projections and/or the ribs may be greater than 0.0625 inch in height. Preferably, the projections and ribs may be within the range of 0.03125-1 inch in height and all incremental values within such range, e.g. 0.0625, 0.125, 0.25, 0.5, etc. More preferably, the projections and/or ribs may be an assortment of the incremental values noted above.

It should be appreciated that the projections may be a number of geometries, including, but not limited to, hemispherical, conical, prism, pyramidal and combinations or truncations thereof. In an embodiment of the present invention, the projections have a top section and a base section, the base section being where the projections are attached to the curved surface.

In a preferred embodiment, the length further comprises a bulbous portion located opposite the cylinder portion. Preferably, the bulbous portion defines a series of knobs wherein the knobs create a surface for the animal or person to grasp without interference from the projections. More preferably, the knobs are a variety of sizes. Most preferably, the length and bulbous portion look like a bone.

In addition, preferably, but by no means limiting, the projections 60 extend from the curved surface 40 and form a substantially perpendicular intersection with the curved surface. Accordingly, the angle of intersection with the curved surface may be about 80-110°. In this fashion, it can be appreciated that when chewed upon by the angle, the supply of projections radially disposed about the entirety of the curved surface 40 (i.e., about the cylinder 30) ensures that within the animal's mouth, there will always be projections substantially perpendicular to the animal's teeth. In that sense, the projections ensure that the animal's teeth are flossed as the substantially perpendicular projections can more easily locate between the teeth of the animal. In addition, since the projections are substantially perpendicularly disposed, some of the projections may serve to simultaneously massage the gums.

The foregoing description is provided to illustrate and explain the present invention. However, the description hereinabove should not be considered to limit the scope of the invention as set forth in the claims appended hereto.

What is claimed is:

1. A method for removing plaque from the exterior surfaces of an animal's teeth comprising:

supplying an edible animal chew of unitary construction from a melt conversion process comprising a molded body having a cylinder portion and a bulbous portion including a series of knobs and depressions separated by a length portion on a common axial centerline, said cylinder portion comprising a curved surface and a planar surface and carrying a plurality of projections extending from said curved surface, wherein said plurality of projections extend radially from said curved surface and substantially perpendicular to said common axial centerline of said animal chew and wherein said projections have a height in the range of 0.0313-1.0 inch and have an angle of intersection with said curved surface of about 80-110 degrees over the entirety of said curved surface, said length portion including said bulbous portion maintaining a portion of said chew for the animal or owner to grasp without interference from said projections, wherein upon chewing by said animal on said cylinder portion of said animal chew containing said projections on said curved surface provides therapeutic action regardless of the radial direction in which said cylinder portion may be configured during chewing.

2. The method for removing plaque from the exterior surfaces of an animal's teeth of claim 1 wherein said cylinder portion further comprises a plurality of ribs extending from said planar surface.

3. The method for removing plaque from the exterior surfaces of an animal's teeth of claim 2 wherein said ribs extend substantially perpendicular to said planar surface and are arranged in a parallel configuration.

4. The method for removing plaque from the exterior surfaces of an animal's teeth of claim 2 wherein said ribs and projections are sized to locate between and contact between the animal's teeth when chewed include a portion of ribs or projections sized to locate between and contact between the front incisors, canines and molars of said animal.

5. The method for removing plaque from the exterior surfaces of an animal's teeth of claim 2 wherein said ribs are greater than 0.0313 inches.

6. The method for removing plaque from the exterior surfaces of an animal's teeth of claim 1 wherein said projections comprise a top section and a base section, said base section attached to said curved surface wherein said top section is a configuration selected from the group consisting of hemispheric, conical, prism, pyramidal and combinations or truncations thereof.

7. The method for removing plaque from the exterior surfaces of an animal's teeth of claim 1 wherein said knobs are assorted sizes.

8. The method for removing plaque from the exterior surfaces of an animal's teeth of claim 1 wherein the edible animal chew comprises a resin, wherein said resin is selected from the group consisting of starch, casein, denatured and partially hydrolyzed collagen and mixtures thereof.

9. The method for removing plaque from the exterior surfaces of an animal's teeth of claim 8 wherein said starch comprises wheat starch.

10. The method for removing plaque from the exterior surfaces of an animal's teeth of claim 8 wherein said starch comprises wheat starch.

11. The method for removing plaque from the exterior surfaces of an animal's teeth of claim 1 wherein said edible chew comprises a humectant.

12. The method for removing plaque from the exterior surfaces of an animal's teeth of claim 1 wherein said edible chew comprises an attractant.

13. The method for removing plaque from the exterior surfaces of an animal's teeth of claim 1 wherein said edible chew comprises vitamins.

14. The method for removing plaque from the exterior surfaces of an animal's teeth of claim 1 wherein said edible chew comprises flavorings.

15. The method of claim 1 wherein said plurality of projections that extend radially from said curved surface are present and extend about substantially the entirety of the curved surface.

16. The method of claim 15 wherein said cylinder portion has a length, and said plurality of projections which extend about the entirety of the curved surface extend substantially along the entirety of said cylinder portion length and define substantially parallel lines along said length.

\* \* \* \* \*